United States Patent
Kingsley-Hefty

(10) Patent No.: US 7,614,551 B2
(45) Date of Patent: Nov. 10, 2009

(54) METHOD AND SYSTEM FOR SECURELY ENCODING AND DECODING BIOMETRIC DATA INTO A MEMORY DEVICE USING A TWO DIMENSIONAL SYMBOL

(75) Inventor: John R. Kingsley-Hefty, Edina, MN (US)

(73) Assignee: Veritec, Inc., Golden Valley, MN (US)

( * ) Notice: Subject to any disclaimer, the term of this patent is extended or adjusted under 35 U.S.C. 154(b) by 0 days.

(21) Appl. No.: 11/589,531

(22) Filed: Oct. 30, 2006

(65) Prior Publication Data
US 2007/0095900 A1    May 3, 2007

Related U.S. Application Data

(60) Provisional application No. 60/731,715, filed on Oct. 31, 2005, provisional application No. 60/739,615, filed on Nov. 23, 2005.

(51) Int. Cl.
*G06K 7/01* (2006.01)
(52) U.S. Cl. ............... 235/382.5; 235/375; 235/382
(58) Field of Classification Search ........... 235/375, 235/382, 382.5
See application file for complete search history.

(56) References Cited

U.S. PATENT DOCUMENTS

| | | | |
|---|---|---|---|
| 4,924,078 A | 5/1990 | Sant'Anselmo et al. | |
| 4,972,475 A | 11/1990 | Sant'Anselmo | |
| 5,331,176 A | 7/1994 | Sant' Anselmo et al. | |
| 5,612,524 A | 3/1997 | Sant'Anselmo et al. | |
| 7,039,813 B2 * | 5/2006 | Algazi et al. | 713/186 |
| 2001/0054154 A1 * | 12/2001 | Tam | 713/186 |
| 2003/0084305 A1 * | 5/2003 | Siegel et al. | 713/186 |
| 2003/0159052 A1 * | 8/2003 | Lee et al. | 713/186 |
| 2005/0269417 A1 | 12/2005 | Wood | |
| 2006/0177106 A1 * | 8/2006 | Wrage | 382/115 |
| 2007/0078780 A1 * | 4/2007 | Tran et al. | 705/65 |

OTHER PUBLICATIONS

International Search Report, May 29, 2007, (3 pgs).

* cited by examiner

*Primary Examiner*—Ahshik Kim
(74) *Attorney, Agent, or Firm*—Kagan Binder, PLLC

(57) ABSTRACT

A method of storing information on a memory device. The method comprises setting up a user to be associated with the memory device including biometric information obtained from a biometric reader. The method also comprises coding at least a portion of the biometric information before storage in the memory device.

23 Claims, 4 Drawing Sheets

METHOD AND SYSTEM FOR SECURELY ENCODING AND DECODING BIOMETRIC DATA INTO A MEMORY DEVICE USING A TWO DIMENSIONAL SYMBOL

REFERENCE TO RELATED APPLICATIONS

This application is a nonprovisional application which claims priority to U.S. Provisional application No. 60/731,715, entitled METHOD AND SYSTEM FOR SECURELY ENCODING AND DECODING BIOMETRIC DATA INTO A MEMORY DEVICE USING A TWO DIMENSIONAL SYMBOL, filed on Oct. 31, 2005, which is herein incorporated by reference in its entirety. This application is a nonprovisional application which also claims priority to U.S. Provisional application No. 60/739,615, entitled METHOD AND SYSTEM FOR SECURELY ENCODING AND DECODING BIOMETRIC DATA INTO A MEMORY DEVICE USING A TWO DIMENSIONAL SYMBOL, filed on Nov. 23, 2005, which is herein incorporated by reference in its entirety.

BACKGROUND

The invention is generally directed to the encoding of digitized biometric information by converting the digital data of the biometric information (or a template of such biometric information) as a symbol that includes a rectangular or two-dimensional (2D) array of data cells that is electronically stored as loaded onto a portable memory device, such as any portable hard drive, flash memory device, or other memory device capable of retrievably storing digital information, such as in particular, a mobile Universal Serial Bus (USB) device. In accordance with one aspect of the present invention, the memory device further includes a biometric reader for storing the digital information that it creates from capturing biometric information directly into the memory device.

Conventionally it is know to have portable fingerprint readers that may be coupled to a computer or other hardware through a USB connector or the like. Such fingerprint readers are conventionally used to provide security for access of information stored on the computer or other hardware to which it is connected. Often, it may be desirable to have security on a portable memory device. Further, it may be desirable to have a fingerprint reader or other biometric device coupled to a memory device that stores a template of a fingerprint or other biometric identifier in a data representation that may be converted to a two-dimensional array symbol.

The techniques herein below extend to those embodiments which fall within the scope of the appended claims, regardless of whether they accomplish one or more of the above-mentioned needs.

SUMMARY

What is provided is a method of storing information on a memory device. The method comprises setting up a user to be associated with the memory device including biometric information obtained from a biometric reader. The method also comprises coding at least a portion of the biometric information before storage in the memory device.

What is also provided is an electronic device. The electronic device comprises a biometric reader. The device also includes storage memory coupled to the biometric reader. Further, the method includes at least a portion of encoding or decoding software stored in the storage memory that is designed to code or decode digital information to or from a two-dimensional bar code.

Further what is provided is a memory device. The memory device comprises a biometric reader. The memory device also comprises a storage memory coupled to the biometric reader. The memory device further includes a communication means to transfer authenticated and decoded information to a receiver associated with other equipment.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
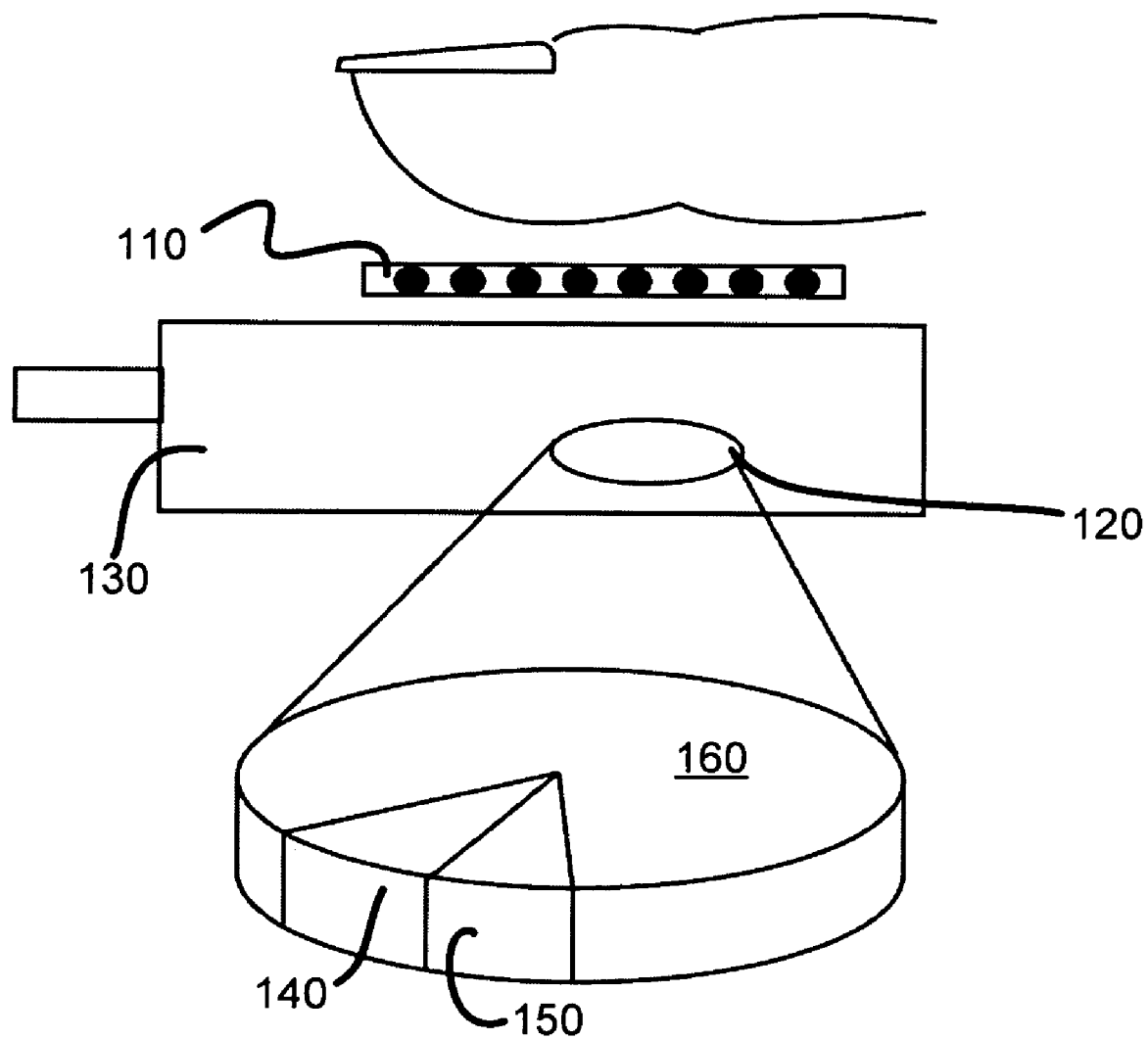
FIG. 1 is an exemplary diagram of a fingerprint reader and memory device combination.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, a fingerprint reader 110 or other biometric sensor, combined with a flash memory capacity 120, commonly known as jump drives or memory sticks or cards 130, is particularly contemplated because of the small size of such fingerprint readers and memory sticks or cards, the portability of such devices, the memory capacity (devices with more than a gigabyte of memory are now commonly available), and the ease of use with almost all computers. Smaller, portable hard disk drives or micro drives are also now available and can be utilized just as well in a similar manner. As well, other devices having built in memory capabilities are also equally applicable. Other types of biometric readers are also contemplated including image capturing devices (e.g. digital cameras), eye or retinal scanners, or the like that are capable of capturing unique biometric information from a user and of converting the biometric information captured into digital data for storage.

In accordance with an exemplary embodiment, converting digital biometric information 150, derived from reader 110, into a two-dimensional bar code or symbol comprising an array of blocks that represent the digital biometric information, provides an effective way to encode the digitally obtained biometric information 150 for security purposes. That is, the information as stored as a representation of a symbol is not decodable without the necessary decoding software 140, and as such, is more secure. Control of decoding software 140 is thus also an aspect of exemplary embodiments of the invention, which control can be accomplished by only loading a portion of the decoding software 140 to a host computer (or processor of any type with sufficient capacity) while retaining necessary operative software 140 on the memory device to work with the software loaded to the host computer. Access to the software 140 on the memory device 130 may then be limited to access like the stored data 160 thereon (including the coded biometric information and any other information) by user authentication via biometric reader 110. Authentication is preferably controlled by a comparison of the information obtained from biometric reader 110 as a user tries to access the stored information of the memory device to previously stored biometric information 150 that can be looked at only after that biometric information is decoded from its symbolic form. Biometric information 140, particularly for fingerprint data, is often referred to as a template. For fingerprint data, such a template 140, would comprise any number of specific identified points of a user's fingerprint that can be stored and reread any number of subsequent times. Such template information is generally considered insufficient for reconstructing any user's actual fingerprint, but comprises accurate data that can be read and subsequently compared to authenticate a user.

A system in accordance with an exemplary embodiment of the invention may allow the biometric 150 and other data to be securely encoded into or with the data array. The system may also allow the encoded data 150 to be decoded allowing access to defined applications, files, data or devices. The method using the 2D code will increase the security of these devices and the secured applications and files stored within the devices as well as programs and files to be securely assigned and shared with others, when compared with traditional assigned PIN numbers and access codes used for security access and data protection.

Methods and systems for securely encoding and decoding biometric data into a mobile memory device 130, such as for example a universal serial bus (USB) device, and using a two dimensional barcode symbology are described in greater detail below with the understanding that other memory devices and biometric readers can just as easily be incorporated together consistent with the desired functionality of the present invention.

Hardware applicable to this invention includes a mobile or detachable USB device with flash memory capability, portable hard drives, or any memory device that is portable with respect to a host computer or machine of any type with processing ability and a biometric capture component with the preferred ability of the memory device to store multiple biometric templates, data, files and applications.

This device may be a jump drive, external hard drive, or any other USB or the like device capable of storing this type of data as combined with a biometric capture device such as a capacitive or optical fingerprint sensor 110, iris scanner, digital camera or the like having the capability to capture and digitize information.

As specific examples, flash memory devices (as jump drives or memory sticks) and portable external hard drives combined with fingerprint reading devices are commercially available from Aimgene Technology Co., Ltd of Taipei, Taiwan, including models BioFlash 1.1, BioFlash 2.0, and Bio-HDD. These devices include the fingerprint reader as integrated with the memory of the flash drives and hard drives so that scanned information can be stored in memory. Fingerprint readers that can be incorporated into such drives and other memory devices are commercially available from Silex Technology of America, Inc. of Salt Lake City, Utah.

Any portable devices that function to store and/or share data can be used in accordance with the present invention. Additional specific examples include cell phones, PDA's, Blackberry type devices, video/dvd players or recorders, game consoles, audio or music players such as MP3 players and the like.

When available, the on board power of a portable devices is preferably used. For traditional USB devices, an expanded version of a jump drive that incorporates a lithium, or other battery power supply "on board" is contemplated. This power supply will be "recharged" when it is attached to a host or shared power device such as PC's, laptops, game consoles, and cellular phones etc., which have their own onboard power or are equipped with power supplies. Typically, 5 volt dc power is used.

When portable devices with on-board power are used, embedded on-board processing can be used in accordance with the present invention. Such processing can be used for one or both of encoding information into codes as well as decoding of the code for information for both authentication and/or authorization of access to information, privileged and business and financial transactions. Applications where the devices will have the ability to authenticate and transmit, without attachment to other systems such as ATM's, POS stations, PC's, laptops, and PDA's, as well as access through access doors and gates are contemplated. The present invention can thus provide a secure authentication bridge to and between systems and devices.

In accordance with a preferred aspect of the present invention, the biometric readers are preferably integrated with the memory device as a portable unit, but it is contemplated that the reader and memory device can be independent units that have connectivity for transferring digital information to and from memory storage.

Software 140 usable in accordance with methods and systems of the present invention will preferably use two dimensional bar code encoding and decoding algorithms. Any known or developed two-dimensional bar coding system is contemplated including the Vericode™ technology commercially available from Veritec Inc. of Golden Valley, Minn., the assignee of the subject invention, the VSCode™ technology also available from Veritec Inc., the Data Matrix™ code, the Code One™ code or any other. With respect to the Vericode™ and VSCode™ technologies, reference is made to U.S. Pat. Nos. 5,612,524, 5,331,176, 4,972,475, and 4,924,078, the entire disclosures of which are incorporated herein by reference for all purposes, for detailed description of such codes and methods and software for encoding and decoding digital information as blocks in an array as a two-dimensional bar code.

For example, data to be encoded can be converted to a binary stream of ones and zeros. The binary information can then be further encrypted to allow Error Detection And Correction (EDAC). Reed-Solomon error correction, now used by almost all 2D bar codes, is a byte-correcting scheme that is widely used for digital storage applications in fields such as telecommunications, for example. By this technique, Reed-Solomon error correcting code words are incorporated along with data code words to form an integrated message. For example, the encrypted binary stream (or data encoded in any other form) can be distributed to a 2-dimensional symbology such as a matrix array. Any linear, area, or stacked symbology can be used. A linear symbology as used herein, refers to a symbology that uses one or more rows of bars and spaces such as a bar code or the like. An area symbology as used herein, refers to any symbology, such as those commercially known under the trade names VeriCode™ or VSCode™ or Data Matrix™ or Code One™ or the like, that employs a matrix of data cells, rather than one or more rows of bars and spaces. A stacked symbology, as used herein, refers to any symbology, such as PDF 417, that generally employs plural adjacent rows of symbols, each row having several characters defined by groups of multiple-width bars and spaces. As an example, the encoded data can be used to create a matrix of Vericode cells. This can be done by digitizing the encoded data into binary bit form and processed by a software algorithm to generate a code. Such techniques are known in the art such as described in the above-identified U.S. patents.

The present invention utilizes such code technology in a similar manner as described except that the writing or actual printing function and the image capturing of the code are unnecessary steps. Reference is also made to co-pending U.S. provisional patent application Ser. No. 11/121,762, filed May 3, 2005 to David Wood, the entire disclosure of which is also incorporated herein by reference, which is directed to storing digital code information in a memory device as a security feature.

Biometric information and templates can be encoded into a secure two-dimensional bar code, such as the VSCode™ (preferred due to its larger capacity), along with certain files and documents. Many of these documents can be protected with an encoded biometric template and unique key code to open them.

Figure 2A:
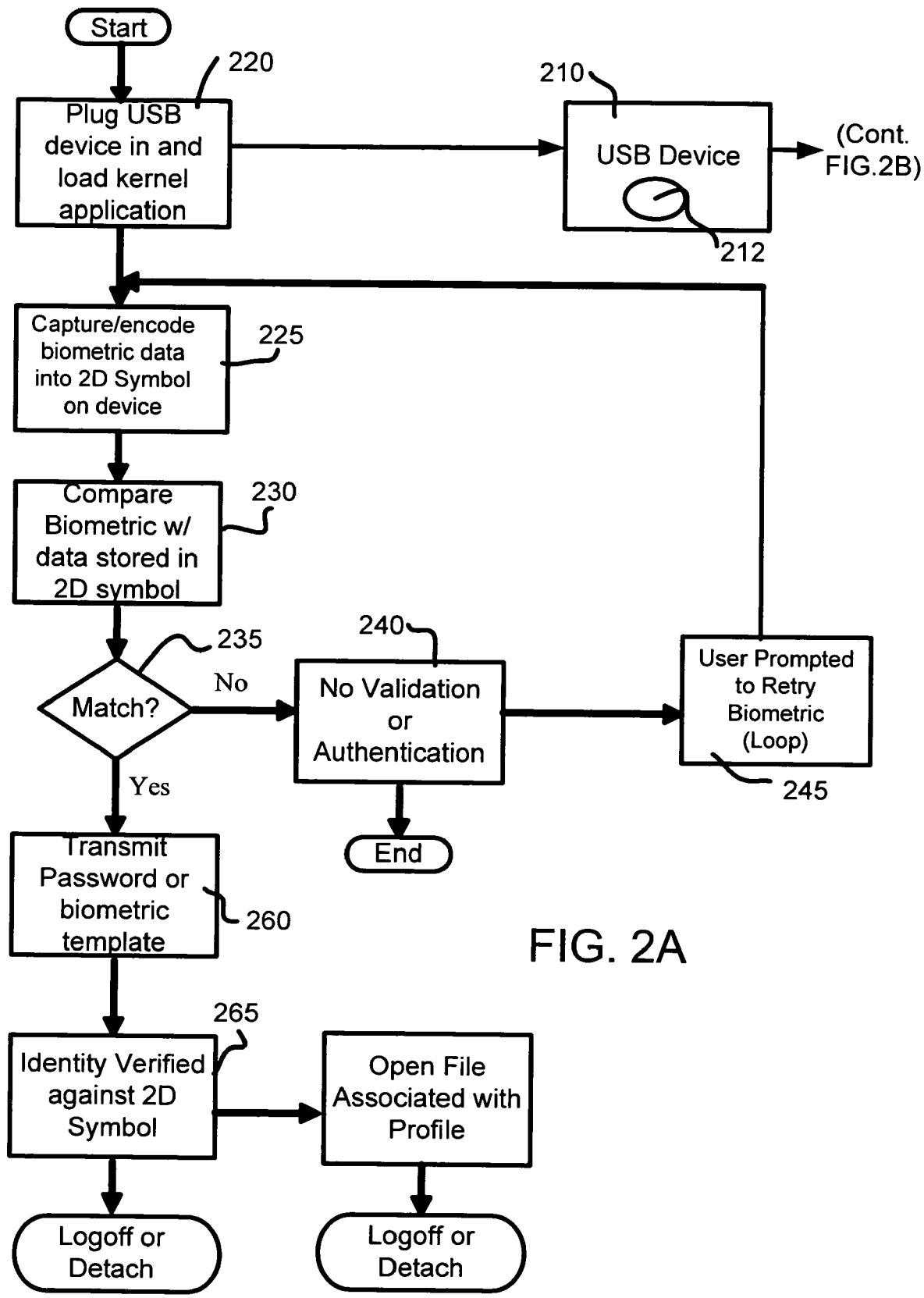
FIGS. 2A and 2B are exemplary embodiments of a method of using the device of FIG. 1.
Figure 2B:
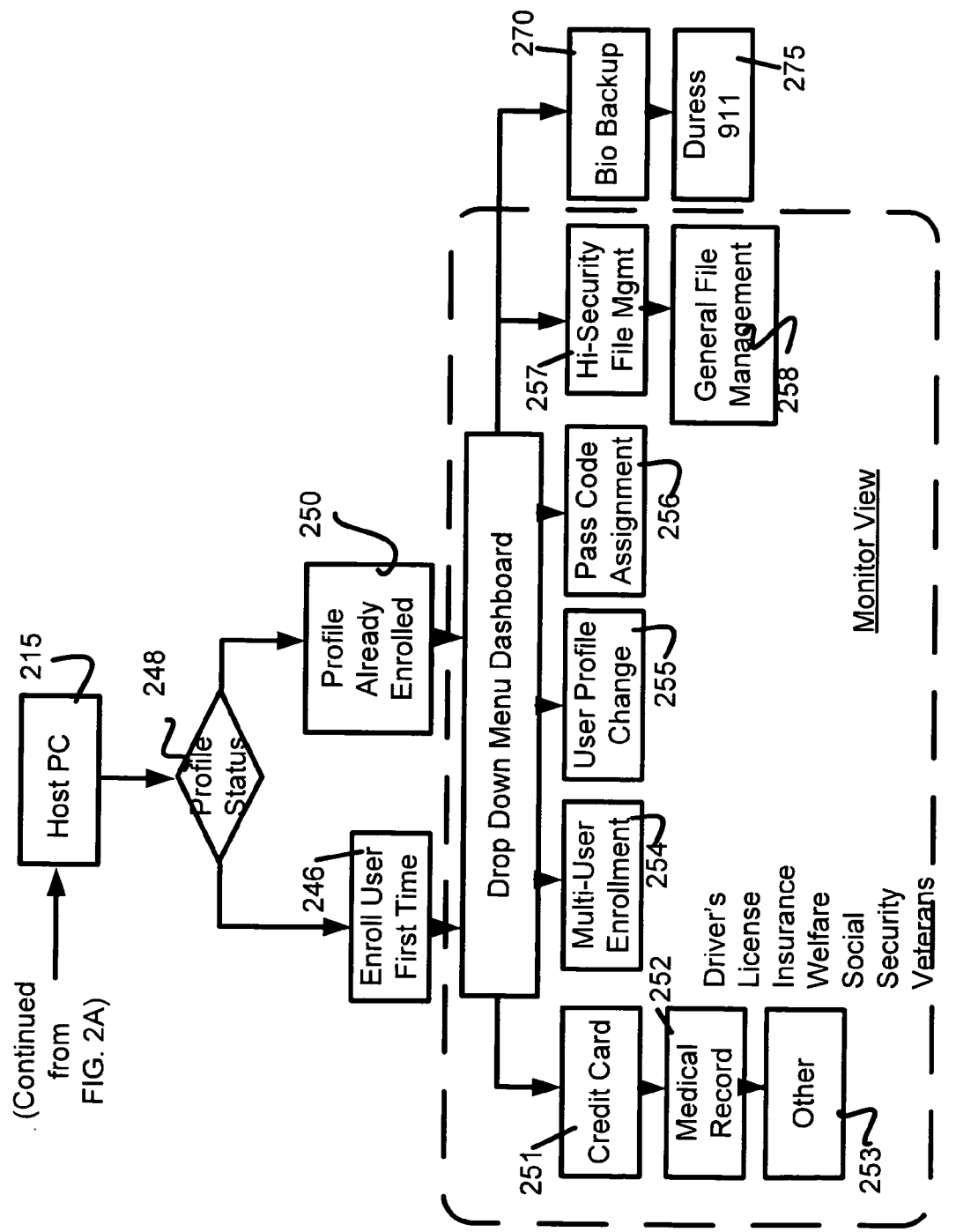

Referring now to FIGS. 2A and 2B, a process 200 is depicted for utilizing a biometric reader/memory device 210. The device may be coupled to or in communication with a computer 215 (process 220). In order to generate the proper code, like the VSCode™, an application kernel is preferably loaded onto computer 215 and run on host computer 215, such as any PC. This application can recognize that the memory device 210 is attached to a computer and can then proceed to launch the application within the RAM area of the host system. Once launched, the application can then make use of the host's processor capability and run the encoding and decoding software from the memory device to generate unique two dimensional matrix codes (process 225). The ability to run a program from a loaded portion of a program working with software code retained on a memory device is well known and established. During an initial enrollment process, a user may determine the existence of an existing personal profile (process 250) or a first time user is enrolled (process 246) after which a menu is provided to a user to access a variety of preferences and profile information, such as credit card numbers 251, medical records 252, other types 253; a selection for enrolling multiple users 254 may be accessed; a charge in user profile 255, a pass code assignment 256, high-security file management area 257, with a general file management area 258. If a user wishes to access secure areas of the device 210 and/or computer 215, a user places his/her finger on sensor 212 which reads the user's fingerprint (process 230). The device 210 then determines whether there is a match between the stored coded biometric information and the just read encoded biometric information (process 210 and process 235). If no validation is determined (process 240), a loop is instated to try again (process 245). If validation is determined a password or biometric template may be transmitted to computer 215 (process 260). The identity of the user is then verified against the 2D symbols stored therein and the system or application is accessed (process 265).

As this application ends or the USB device is removed, the application will recognize that the connection is broken and will then deactivate and "dissolve" without leaving any type of application files on the host directory or hard drive, as such ability to dissolve the loaded code portion is also known. Alternatively, the loaded code portion may be left in processor memory as non-functional.

The memory device thus preferably includes at least a portion of the coding and decoding software for generating a code or reading a stored code with the help of the host computer or processor. More preferably, the coding and decoding software is maintained in the memory of the memory device for as long as the memory device is usable for one or more designated users. This provides the portability of the memory device without requiring that any specific coding or decoding software be present on any computer or processor (as may be provided as part of a commercial machine, like an ATM, cash register, or the like), and further adds to the security of the memory device in that the software required to decode stored or to access stored information can only be accessed after a biometric authentication that requires a decoding process. It is contemplated, however, that the coding and/or decoding software could instead be fully loaded onto any host computer or processor so that such software is not needed on the memory device for operation of biometric authentication via the memory device.

Referring again to FIG. 2. Processes, for example, for this invention using a mobile USB device with a fingerprint sensor is as follows with the understanding that similar concepts are contemplated and supported that utilize other known or developed memory devices and/or other known or developed biometric readers.

A USB device 210 can contain a secured section on its drive that holds a small mini executable application. The rest of the drive, at this point, would be open for standard data storage.

The USB device 210 is plugged into any local USB port found on a host computer 215, such as a PC. Once plugged in, the device is automatically provided power and can then begin to load a two-dimensional bar code executable application, such as the VSCode™, onto the RAM of the host and utilizing its processor speed (process 220). Once the application is running, it will check back on to the memory device, e.g. the jump drive, to see if an initial master profile has been established for the subject memory device (process 248). If a master profile has not been established, then it will start a set-up screen and allow the individual to create a "Master User Profile" for the owner of the USB device (process 254). This master profile will preferably comprise a secured fingerprint template along with defined permissions and applications to be accessed and used on the memory device.

If a master profile has already been established (process 250), then the application can instead run a "dashboard drop down menu" that enables the user to attach the master's Bio-authorized two-dimensional code, such as the VSCode™, to access individual applications, programs, and files. This utility allows the master to have secure access to multiple programs and files. In addition, once the dashboard is accessed, the master may assign multiple bio-codes representing multiple sub-user's enrollments within a "secure user's library" to run and access multiple programs and files (process 254). Such secure user library can be created by reading any number of other's fingerprints, creating templates of such other user's fingerprints, and storing the templates on the memory device along with the master's template. It is also contemplated that more than one master template can be accommodated and stored within a single memory device that can be associated with similar or different privileges from one to another. By allowing another user's template to be connected with a data file, that other user can then gain access to any data file stored by the memory device master. To do this, the master user can attach and send or otherwise download the data file to the other user, who, by his/her own authentication by fingerprint, can then open the file after such authentication.

Programs provided on the memory device may include: multi sub-user enrollment and library, user-profile updates and changes (process 255), pass-code assignments (process 256), and the like. Also available would be secure credit card usage (process 251), medical records (process 252), other personal documents and records (process 253). It will also allow the use of standard and secure document storage. This application will also have the ability to add a backup (process 270) along with a duress bio-template profile in cases of emergency (process 275).

One or more data files can require access by biometric authentication of more than one user, whether including the master user or not. That is, a data file can require authentication by plural biometric templates, sometimes referred to in the security field as the "two-man rule." Such biometric templates can be accumulated within a user's library by physical access to any number of users and having each desired person do a scan under an "add user template" function. Otherwise, it is contemplated that any secure manner of exchanging a template from a user to another can be utilized, but it is preferably that a secure manner provides authentication that the template received is actually from the desired user to be added.

Figure 3:
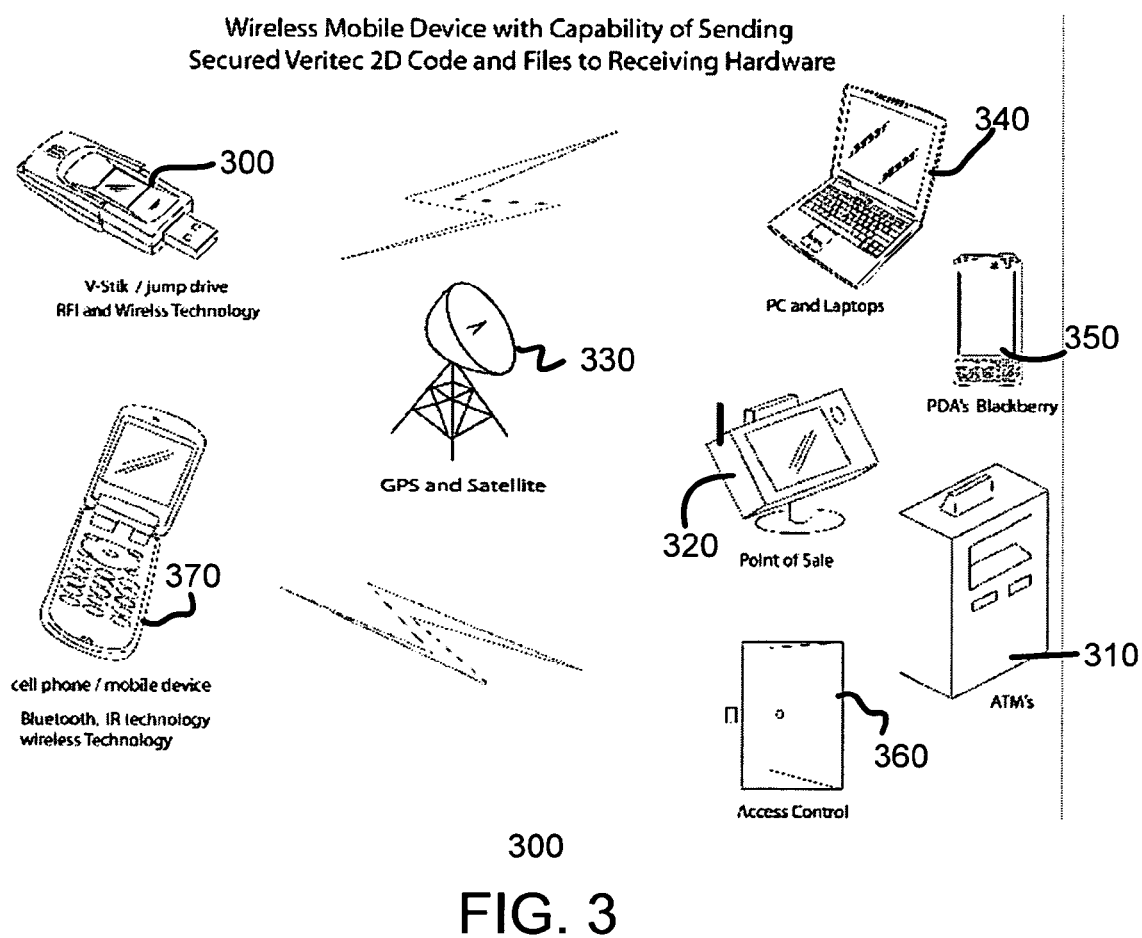
FIG. 3 is an exemplary diagram of a variety of electronic devices which may encompass, or may be associated with the invention.

Referring to FIG. 3, for commercial applications, in particular, it is also preferred that the memory device 300 have the ability to communicate with commercial equipment of the type having some processor ability, such as ATMs 310, cash registers or point of sale locations 320, and the like. Such communication can be provided by way of the computer connection, e.g. a USB connector, or by other techniques such as Blue Tooth, IR, wireless, and GPS or satellite means of communication 330. In this regard, it is further contemplated to incorporate other communication techniques as presently known or future developed into the memory device. For example, an RFID type chip can be incorporated with the memory device to also have access to the memory device's memory in a similar manner as does the biometric reader. Such a chip, when exposed to the appropriate radio frequency, would be able to communicate a defined capacity of information to a receiver that may be incorporated within the commercial equipment. All of the above security features would still provide secure use of the data files, such as may include passwords, account information, multiple commercial or banking accounts, and the like, by only the authenticated user based upon biometric access. As such, it can be seen that many commercial transactions could be accommodated by such a memory device incorporated with a biometric reader, that further preferably includes the ability to store information as data files and including biometric information, in particular, in a coded form. Similarly, such memory devices are usable for medical records and access thereto, tracking medical procedures by the accumulation of sequential biometric templates, and other patient and/or medical treatment information. Also, memory devices in accordance with the present invention are usable for the playing electronic games including in particular the playing of games on multiple game consoles. A user can take a stored game data file to another's console with protection of the user's game file from access by others. Likewise, controlled access by others can be provided for shared games and the like.

Further, it may be desirable to use device 300 to access data on PCs and laptops 340, PDAs, handheld computers, and Blackberries 350, and access controllers such as security devices 360. Also, other devices having the capabilities of device 300 may include, but not limited to cell phones and other mobile devices 370.

Multiple codes can also be established and transmitted. Much like file folders or partitions; each code has a unique identifier. When multiple codes are transmitted, the codes that are to be shared are sent. On the receiving end, those devices will be programmed to only decode those codes that have the proper "identifier heading(s)". For example, when presenting a device to an ATM, preferably only the ATM code file would open; at a medical facility, preferably only medical information would open; for vehicle and driver license applications, only Motor Vehicle/registration information would open, for company information, only company files would open. Within these "folders" or partitions, multiple files and folders can be stored, each protected with an attached Code flag. All of these partitions, folders and individual files and documents may only be assigned, stored, moved, shared and opened with authentication.

All of the mentioned applications can be secured by encoding a key and biometric profile into a unique two-dimensional bar code, such as the VSCode™, which can be attached to the application and secured files. This will keep unauthorized people from accessing the data. All files, data, libraries and applications can be stored on the memory device space and removed from a host computer or processor.

Once a defined application is running, it can provide a cross-check between the application or data profile and the provided live biometric.

If the live biometric and the registered profile templates do not match, the individual can be asked to either provide the live scan again or the correct biometric. Preferably, this process will continue only for a limited number of times, preferably three times, prior to exiting or denying access for this individual.

If the live biometric and the registered profile templates do match, then the proper pass codes will be provided to open the applications and/or any associated data files that can then be opened and access allowed. These coded templates can be assigned in any number of ways to the master as well as to one or more designated sub-users.

This method and system preferably utilizes the VSCode™ application utility in securing profiles, data and applications. This method is capable of maintaining and sharing these code templates, files and documents in an electronic format and has the ability to print these code templates in a 2D barcode format as document tags/keys. In addition, for high security document control, this system allows for complete encapsulation of both the authorization tag and any core document or other data file.

In addition to the personal ID/information privacy needs of an individual, the present invention can also be used to "flag and protect" intellectual property, classified information, and individual files and documents that are important to the individual and the company. The ability to both embed codes/technologies within the portable devices and/or attach codes to information transmitted or shared, and the ability to assign authorized and verified recipients of this information and property, and the ability to authorize and authenticate transactions in commerce are also possible.

Devices in accordance with the present invention can be an integrated unit, preferably including at least a portion of the coding and/or decoding software or can be provided as separate units having the ability to communicate digital information between them (i.e. to and from the biometric reader and the memory). Other communication devices can likewise be added as integrated or not with the memory device.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

The invention claimed is:

1. A method of storing information on a memory device comprising:
    setting up a user to be associated with the memory device, in order to selectively control access to stored information on the memory device, the step of setting up a user including a step of obtaining biometric information from a biometric reader;
    coding at least a portion of the biometric information before storage in the memory device, wherein the coding comprises a bar coding process so that biometric information will be stored as a representation of a bar code symbology;
    storing the representation of the bar code symbology within memory of the memory device;
    storing at least one additional file on the memory device; and
    protecting the at least one additional file with the biometric information stored in the representation of the bar code symbology
    wherein protecting the at least one additional file includes encoding the at least one additional file with the biometric information stored in the representation of the bar code symbology.

2. The method of claim 1, wherein the biometric information is coded within the memory device as digital information that is created as part of a two-dimensional bar coding process.

3. The method of claim 1, further comprising:
    determining whether the user has a profile already encoded on the memory device.

4. The method of claim 1, further comprising:
    determining whether the biometric information that has been encoded matches encoded biometric information stored on the memory device.

5. The method of claim 1, further comprising:
    determining which files on the memory device are associated with the user.

6. The method of claim 1, further comprising:
    allowing access to predetermined information or functionality based on a match of received encoded biometric information with stored encoded biometric information on the memory device.

7. The method of claim 1 wherein the at least one additional file is one of a data file, an application file and a program file.

8. The method of claim 1 wherein protecting the at least one additional file includes protecting the at least one additional file with the representation of the bar code symbology of the biometric information stored in the representation of the bar code symbology.

9. A memory device comprising:
    a biometric reader;
    a storage memory coupled to the biometric reader, the storage memory having stored therein a coded representation of biometric information associated with a particular user, the coded representation part of a two-dimensional bar coding process; and
    a communication means to transfer authenticated and decoded information to a receiver associated with other equipment,
    wherein the biometric reader is configured to receive biometric information from a user for comparison with the stored representation of a user's biometric information in the form of the two-dimensional bar code symbology in order to authorize selective access to stored information on the storage memory; and
    at least one additional file stored in the memory device, the at least one additional file protected with the biometric information associated with the particular user
    wherein the at least one additional file is encoded with the biometric information associated with the particular user.

10. The memory device of claim 9, wherein the storage memory comprises flash memory.

11. The memory device of claim 9, wherein the storage memory comprises magnetic disk storage.

12. The memory device of claim 9, wherein the biometric reader comprises a fingerprint sensor.

13. The memory device of claim 9, wherein the biometric reader comprises a camera.

14. The memory device of claim 9, wherein the biometric reader comprises a retinal or choroidal sensor.

15. The memory device of claim 9, wherein the biometric reader may be used for both an enrollment function and a validation function.

16. The memory device of claim 9, wherein the communication means comprises an electronic contact based connection.

17. The memory device of claim 9, wherein the communication means comprises a wireless connection.

18. The memory device of claim 9 wherein the at least one additional file is one of a data file, an application file and a program file.

19. The memory device of claim 9 wherein the at least one additional file is protected with the stored representation of a user's biometric information in the form of the two-dimensional bar code symbology.

20. A method of storing information on a memory device comprising:
    setting up a user to be associated with the memory device, in order to selectively control access to stored information on the memory device, the step of setting up a user including a step of obtaining biometric information from a biometric reader;

coding at least a portion of the biometric information before storage in the memory device, wherein the coding comprises a bar coding process so that biometric information will be stored as a representation of a bar code symbology;

storing the representation of the bar code symbology within memory of the memory device;

storing at least one additional file on the memory device; and protecting the at least one additional file with the biometric information stored in the representation of the bar code symbology wherein protecting the at least one additional file includes requiring the biometric information stored in the representation of the bar code symbology to release at least one passcode to the at least one additional file.

21. A method of storing information on a memory device comprising:

setting up a user to be associated with the memory device, in order to selectively control access to stored information on the memory device, the step of setting up a user including a step of obtaining biometric information from a biometric reader;

coding at least a portion of the biometric information before storage in the memory device, wherein the coding comprises a bar coding process so that biometric information will be stored as a representation of a bar code symbology;

storing the representation of the bar code symbology within memory of the memory device;

storing at least one additional file on the memory device; protecting the at least one additional file with the biometric information stored in the representation of the bar code symbology; and forming an area of the memory device which requires the biometric information stored in the representation of the bar code symbology to access, wherein protecting the at least one additional file includes locating the at least one additional file in an area of the memory device which requires the biometric information.

22. A memory device comprising:

a biometric reader;

a storage memory coupled to the biometric reader, the storage memory having stored therein a coded representation of biometric information associated with a particular user, the coded representation part of a two-dimensional bar coding process; and a communication means to transfer authenticated and decoded information to a receiver associated with other equipment, wherein the biometric reader is configured to receive biometric information from a user for comparison with the stored representation of a user's biometric information in the form of the two-dimensional bar code symbology in order to authorize selective access to stored information on the storage memory; and at least one additional file stored in the memory device, the at least one additional file protected with the biometric information associated with the particular user wherein the biometric information associated with the particular user is required to release at least one passcode to the at least one additional file.

23. A memory device comprising:

a biometric reader;

a storage memory coupled to the biometric reader, the storage memory having stored therein a coded representation of biometric information associated with a particular user, the coded representation part of a two-dimensional bar coding process; and a communication means to transfer authenticated and decoded information to a receiver associated with other equipment, wherein the biometric reader is configured to receive biometric information from a user for comparison with the stored representation of a user's biometric information in the form of the two-dimensional bar code symbology in order to authorize selective access to stored information on the storage memory;

at least one additional file stored in the memory device, the at least one additional file protected with the biometric information associated with the particular user; and a memory area of the memory device that requires the biometric information associated with the particular use to access, and wherein the at least one additional file is located in said memory area.

* * * * *